United States Patent
Thota

(10) Patent No.: US 11,218,865 B2
(45) Date of Patent: *Jan. 4, 2022

(54) SMART SEARCHING OF WIRELESS DEVICES USING DEVICE LOCATION INFORMATION

(71) Applicant: Intel Corporation, Santa Clara, CA (US)

(72) Inventor: Praveen Thota, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/691,339

(22) Filed: Nov. 21, 2019

(65) Prior Publication Data

US 2020/0296568 A1    Sep. 17, 2020

Related U.S. Application Data

(63) Continuation of application No. 16/006,408, filed on Jun. 12, 2018, now Pat. No. 10,499,237, which is a (Continued)

(30) Foreign Application Priority Data

Oct. 3, 2012  (IN) .......................... 4118/CHE/2012

(51) Int. Cl.
*H04W 8/00*     (2009.01)
*H04W 48/20*    (2009.01)
(Continued)

(52) U.S. Cl.
CPC ........... *H04W 8/005* (2013.01); *H04W 4/023* (2013.01); *H04W 4/025* (2013.01); *H04W 4/029* (2018.02);
(Continued)

(58) Field of Classification Search
CPC ..... H04W 8/005; H04W 76/30; H04W 4/029; H04W 4/023; H04W 4/025; H04W 48/14; H04W 48/16; H04W 48/20
See application file for complete search history.

(56) References Cited

U.S. PATENT DOCUMENTS 6,222,483 B1    4/2001  Twitchell et al.
8,855,830 B2   10/2014  Imes et al.
(Continued)

FOREIGN PATENT DOCUMENTS

CN    101606405    12/2009
JP    2005080071    3/2005
(Continued)

OTHER PUBLICATIONS

United States Patent and Trademark Office, "Non-final Office Action," issued in connection with U.S. Appl. No. 16/911,080, dated Jul. 31, 2020, 12 pages.
(Continued)

*Primary Examiner* — Khai M Nguyen
(74) *Attorney, Agent, or Firm* — Hanley, Flight & Zimmerman, LLC

(57) ABSTRACT

Particular embodiments described herein provide for an apparatus, such as a wireless electronic device, that includes a memory element configured to store electronic code, a processor operable to execute instructions associated with the electronic code, and at least one module. The at least one module is configured to receive first location information identifying a first location associated with an electronic device. The at least one module is further configured to receive first connection location information indicative of a second location of the electronic device at a time of connection with a first wireless device. The at least one module is further configured to evaluate for a presence of the first
(Continued)

wireless device when the first location is within a predetermined distance of the second location.

22 Claims, 4 Drawing Sheets

Related U.S. Application Data continuation of application No. 15/295,520, filed on Oct. 17, 2016, now Pat. No. 9,998,904, which is a continuation of application No. 14/752,918, filed on Jun. 27, 2015, now Pat. No. 9,473,924, which is a continuation of application No. 13/977,013, filed as application No. PCT/US2012/071847 on Dec. 27, 2012, now Pat. No. 9,072,045.

(51) Int. Cl.
*H04W 48/16* (2009.01)
*H04W 4/02* (2018.01)
*H04W 48/14* (2009.01)
*H04W 76/30* (2018.01)
*H04W 4/029* (2018.01)

(52) U.S. Cl.
CPC ........... *H04W 48/14* (2013.01); *H04W 48/16* (2013.01); *H04W 48/20* (2013.01); *H04W 76/30* (2018.02)

(56) References Cited

U.S. PATENT DOCUMENTS

| | | | |
|---|---|---|---|
| 9,072,045 B2 | 6/2015 | Thota | |
| 9,473,924 B2 | 10/2016 | Thota | |
| 9,998,904 B2 | 6/2018 | Thota | |
| 10,499,237 B2 | 12/2019 | Thota | |
| 2007/0155399 A1* | 7/2007 | Alberth, Jr. | H04W 64/00 455/456.1 |
| 2008/0080457 A1* | 4/2008 | Cole | H04L 12/5692 370/342 |
| 2008/0096580 A1 | 4/2008 | Montemurro | |
| 2009/0061870 A1* | 3/2009 | Finkelstein | H04W 48/20 455/435.2 |
| 2009/0117848 A1 | 5/2009 | Nagata et al. | |
| 2010/0007496 A1 | 1/2010 | Orlassino | |
| 2010/0240394 A1* | 9/2010 | Yamada | H04M 1/2746 455/456.1 |
| 2012/0071163 A1* | 3/2012 | Klingenbrunn | H04W 48/18 455/435.2 |
| 2012/0215437 A1 | 8/2012 | Hao et al. | |
| 2012/0258726 A1 | 10/2012 | Bansal et al. | |
| 2013/0097446 A1 | 4/2013 | Bernard et al. | |
| 2013/0210425 A1 | 8/2013 | Nagaraj | |
| 2013/0272269 A1* | 10/2013 | Srivastava | H04W 36/32 370/332 |
| 2013/0322419 A1* | 12/2013 | Fedotenko | H04L 67/30 370/338 |
| 2014/0018100 A1 | 1/2014 | Yamada et al. | |
| 2014/0047536 A1* | 2/2014 | Jung | H04L 51/00 726/16 |
| 2014/0068494 A1 | 3/2014 | Petersen et al. | |
| 2014/0094137 A1 | 4/2014 | Gregory | |
| 2014/0105003 A1* | 4/2014 | Austin | H04W 72/0413 370/229 |
| 2014/0369217 A1* | 12/2014 | Kim | H04W 24/08 370/252 |
| 2015/0382170 A1 | 12/2015 | Thota | |
| 2017/0188298 A1* | 6/2017 | Pattan | H04W 36/0022 |
| 2019/0098481 A1 | 3/2019 | Thota | |
| 2020/0329362 A1* | 10/2020 | Thota | H04W 76/30 |

FOREIGN PATENT DOCUMENTS

| | | |
|---|---|---|
| JP | 2008182507 | 8/2008 |
| JP | 2010171993 | 8/2010 |
| WO | 2007079108 | 7/2007 |

OTHER PUBLICATIONS

United States Patent and Trademark Office, "Notice of Allowance," issued in connection with U.S. Appl. No. 16/911,080, dated Sep. 30, 2020, 9 pages.
State Intellectual Property Office of China, "Office Action," issued in connection with Chinese Patent Application No. 201280075590.3, dated August 1, 2017, 12 pages.
European Patent Office, "Extended European Search Report," issued in connection with European Patent Application No. 12886140.8, dated May 2, 2016, 7 pages.
International Searching Authority, "International Search Report and Written Opinion," issued in connection with International Patent Application No. PCT/US2012/071847, dated May 15, 2013, 7 pages.
United States Patent and Trademark Office, "Non-final Office Action," issued in connection with U.S. Appl. No. 13/977,013, dated Nov. 3, 2014, 6 pages.
United States Patent and Trademark Office, "Notice of Allowance," issued in connection with U.S. Appl. No. 13/977,013, dated Feb. 25, 2015, 7 pages.
United States Patent and Trademark Office, "Notice of Allowance," issued in connection with U.S. Appl. No. 14/752,918, dated Jun. 17, 2016, 7 pages.
Korean Intellectual Property Office, "Notice of Preliminary Rejection," issued in connection with Korean Patent Application No. 2015-7005397, dated Apr. 25, 2016, 4 pages.
Japanese Patent Office, "Notice of Reasons for Rejection," issued in connection with Japanese Patent Application No. 2015-528450, dated Mar. 15, 2016, 3 pages.
International Searching Authority, "International Preliminary Report on Patentability," issued in connection with International Patent Application No. PCT/US2012/071847, dated Apr. 7, 2015, 5 pages.
United States Patent and Trademark Office, "Non-final Office Action," issued in connection with U.S. Appl. No. 14/752,918, dated Jan. 25, 2016, 8 pages.
United States Patent and Trademark Office, "Notice of Allowance," issued in connection with U.S. Appl. No. 15/295,520, dated Sep. 7, 2017, 7 pages.
United States Patent and Trademark Office, "Non-final Office Action," issued in connection with U.S. Appl. No. 15/295,520, dated Apr. 7, 2017, 8 pages.
Indian Patent Office, "First Examination Report," issued in connection with Indian Patent Application No. 4118/CHE/2012, dated Sep. 28, 2018, 6 pages.
European Patent Office, "Intention to Grant," issued in connection with European Patent Application No. 12886140.8, dated May 11, 2018, 30 pages.
State Intellectual Property Office of China, "Office Action" issued in connection with Chinese Patent Application No. 201280075590.3, dated Jul. 8, 2019, 9 pages.
European Patent Office, "Decision to Grant a European Patent Pursuant to Article 97(1) EPC," issued in connection with European Application No. 12886140.8, dated Mar. 14, 2019, 1 page.
State Intellectual Property Office of China, "Decision of Rejection" issued in connection with Chinese Patent Application No. 201280075590.3, dated Jan. 9, 2019, 7 pages.
United States Patent and Trademark Office, "Non-final Office Action," issued in connection with U.S. Appl. No. 16/006,408, dated Jan. 11, 2019, 9 pages.
United States Patent and Trademark Office, "Notice of Allowance," issued in connection with U.S. Appl. No. 16/006,408, dated Jul. 29, 2020, 8 pages.
State Intellectual Property Office of China, "Notice of Granting Patent Right for Invention" issued in connection with Chinese

(56) References Cited

OTHER PUBLICATIONS

Patent Application No. 201280075590.3, dated Oct. 29, 2019, 4 pages.

* cited by examiner

SMART SEARCHING OF WIRELESS DEVICES USING DEVICE LOCATION INFORMATION

CROSS-REFERENCE TO RELATED APPLICATIONS

This patent arises from a continuation U.S. patent application Ser. No. 16/006,408 (Now U.S. Pat. No. 10,499,237), filed on Jun. 12, 2018, entitled "Smart Searching Of Wireless Devices Using Device Location Information," which is a continuation U.S. patent application Ser. No. 15/295,520 (Now U.S. Pat. No. 9,998,904), filed on Oct. 17, 2016, entitled "Smart Searching Of Wireless Devices Using Device Location Information," which is a continuation of U.S. patent application Ser. No. 14/752,918 (Now U.S. Pat. No. 9,473,924), filed on Jun. 27, 2015, entitled "Smart Searching Of Wireless Devices Using Device Location Information," which is a continuation of U.S. patent application Ser. No. 13/977,013 (Now U.S. Pat. No. 9,072,045), filed on Aug. 28, 2013, entitled "Smart Searching Of Wireless Devices Using Device Location Information," which is a National Stage Entry of, and claims priority to, PCT Application No. PCT/US12/71847, filed on Dec. 27, 2012, entitled "Smart Searching Of Wireless Devices Using Device Location Information," which claims priority to Indian Patent Application Serial No. 4118/CHE/2012 filed before the Patent Office of India on Oct. 3, 2012, the contents of the aforementioned applications and patents are hereby incorporated herein by reference in their entireties for all purposes.

TECHNICAL FIELD

Embodiments described herein generally relate to smart searching of wireless devices using device location information.

BRIEF DESCRIPTION OF THE DRAWINGS

Embodiments are illustrated by way of example and not by way of limitation in the FIGURES of the accompanying drawings, in which like references indicate similar elements and in which.

Figure 1:
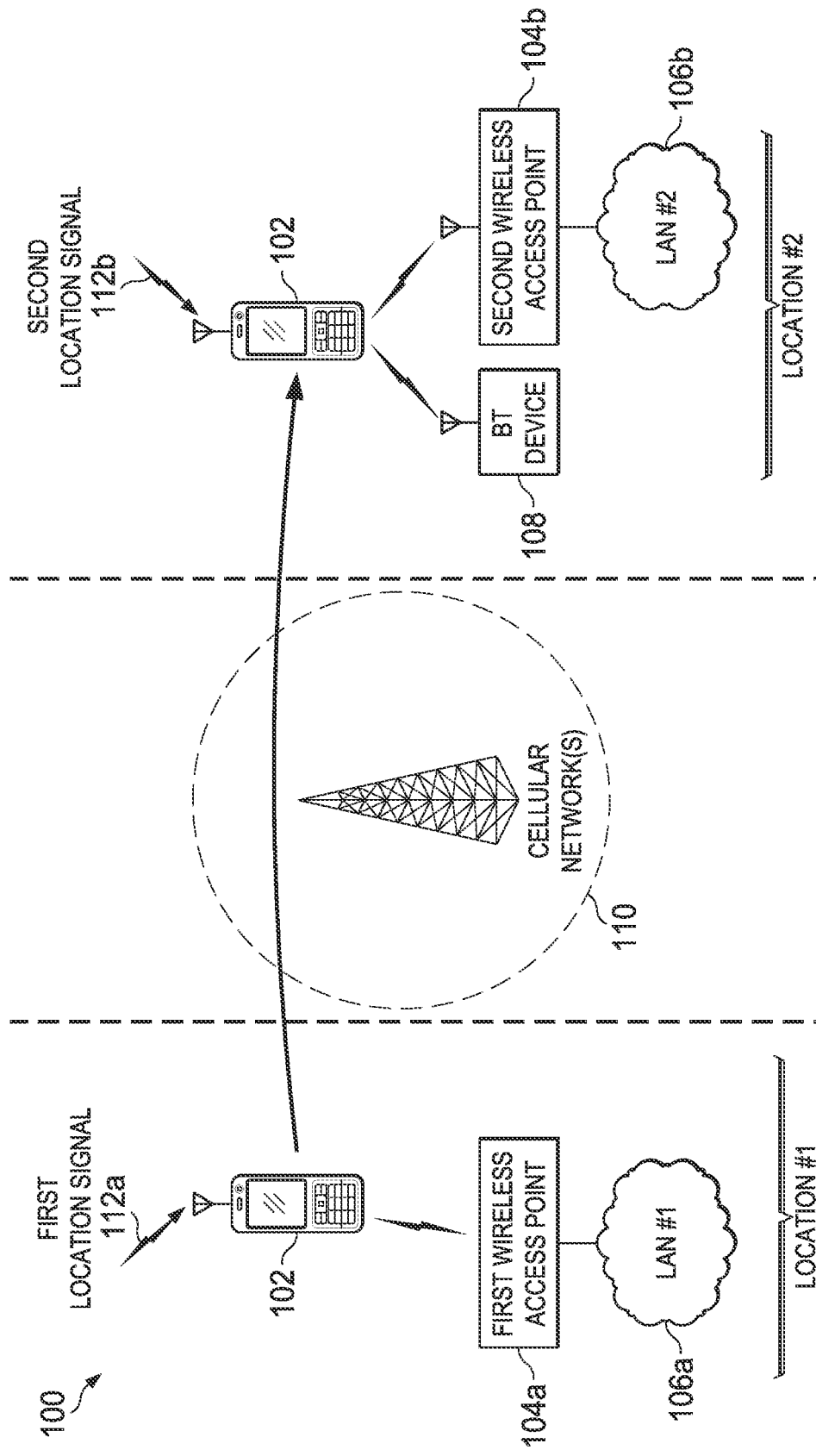
FIG. 1 is a simplified diagram illustrating an embodiment of a communication system for smart searching of wireless devices using device location information in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to smart searching of wireless devices using device location information. Features such as structure(s), function(s), and/or characteristic(s), for example, are described with reference to one embodiment as a matter of convenience; various embodiments may be implemented with any suitable one or more of the described features.

Traditional wireless electronic devices (e.g., cell phones, smart phones, wireless-enable laptops and notebook computers, etc.) constantly scan for neighboring wireless electronic devices using a pseudorandom exponential time period between scans. In such a process, the searching electronic device searches for available neighboring devices for a set period and then sleeps for a random exponential time period. In this scenario, the battery of the searching device is drained quickly regardless of whether there are any electronic devices within the vicinity of the searching electronic device to be found. Hence, there are drawbacks associated with current wireless electronic devices that constantly search for neighboring electronic devices such as an increase in power consumption by the searching device.

Particular embodiments described herein provide for an apparatus, such as a wireless electronic device, that includes a memory element configured to store electronic code, a processor operable to execute instructions associated with the electronic code, and at least one module. The at least one module is configured to receive first location information identifying a first location associated with an electronic device. The at least one module is further configured to receive first connection location information indicative of a second location of the electronic device at a time of connection with a first wireless device. The at least one module is further configured to evaluate for a presence of the first wireless device when the first location is within a predetermined distance of the second location.

In more particular embodiments, the at least one module is further configured to enable a radio module when the first location is within the predetermined distance of the second location. In yet other embodiments, the at least one module is further configured to receive a device identifier associated with the first wireless device, and store the device identifier in association with the first connection location information. In more particular embodiments, the device identifier and first connection location information are to be stored in a database.

In still other particular embodiments, the at least one module is further configured to connect to the first wireless device, receive third location information for identifying a third location associated with the electronic device, and update the stored first connection location information with the third location information. In a particular embodiment, updating the stored first connection location information includes replacing the first connection location information with the third location information. In still another particular embodiment, updating the stored first connection location information includes adding the third location information to the stored first connection location information.

In still other embodiments, the at least one module is further configured to receive fourth location information identifying a fourth location associated with the electronic device at a time of disconnection from the first wireless device, and store the fourth location information as disconnection location information in association with the device identifier. In other particular embodiments, the at least one module is further configured to receive fifth location information identifying a fifth location associated with the electronic device, and disable a radio module when the fifth location is within a predetermined distance of the fourth location.

Smart Searching of Wireless Devices Using Device Location Information

Referring now to FIG. 1, FIG. 1 is a simplified diagram illustrating an embodiment of a communication system 100 for smart searching of wireless devices using device location information in accordance with one embodiment of the present disclosure. Communication system 100 includes a wireless electronic device 102, a first wireless access point 104a in communication with a first Local Area Network (LAN) 106a, a second wireless access point 104b in communication with a second LAN 106b, a Bluetooth™ wireless device 108, and one or more cellular networks 110. In one or more embodiments, wireless electronic device 102 may include any suitable device having wireless connectivity capability such as a mobile device, a cellular telephone, a smartphone, a notebook computer, a laptop computer, a tablet computer and/or a tablet device (e.g., an i-Pad), a personal digital assistant (PDA), etc. In a particular embodiment, first wireless access point 104a and second wireless access point 104b are Wi-Fi enabled wireless access points. In other embodiments, first wireless access point 104a and second wireless access point 104b may employ other suitable wireless technologies.

Various embodiments described herein provide for wireless electronic device 102 to scan wireless devices within its vicinity and build a database of devices to which wireless electronic device 102 connects as well as a location of wireless electronic device 102 at the time of connection. In such embodiments, the location may be later used to trigger scans for the particular devices when wireless electronic device 102 is again brought within proximity to the location associated with the particular devices. For example, a user may scan wireless devices using wireless electronic device 102 while located at a Home location at earlier instances of time. When wireless electronic device 102 is brought within proximity of the Home location at a later instance of time, wireless electronic device 102 may be configured to trigger a scan for one or more devices associated with the Home location when wireless electronic device 102 determines that its current location is within a predetermined range of the stored location information. Similarly, a user may scan wireless devices located at an Office location at an earlier time to trigger a scan for the wireless devices associated with the Office location when wireless electronic device 102 later detects its current location within a predetermined range or distance of the stored location information associated with wireless devices at the Office location.

As discussed, current approaches lack adequate means for triggering a scan based on location of the scanning device. In current approaches, a scanning algorithm of a wireless electronic device searches for devices in an exponential time interval irrespective of whether the wireless electronic device is located in the same location for a long period of time. In various embodiments described herein, scans are initiated by a searching device by taking into account the current location of the searching device. In some embodiments, if there is no change in location of the searching device, a scan may not be performed by the searching device. In one or more embodiments, wireless electronic device 102 initiates a scanning procedure to build a profile database of devices to wireless electronic device 102 connects in association with location information indicating a current location of wireless electronic device 102 at the time of connection. The location information may be later used to trigger a scan for the devices when wireless electronic device 102 is within proximity to the previously determined location.

Further elaborating upon these concepts, in a first instance of time wireless electronic device 102 is located at a first location (Location #1) that is proximate to first wireless access point 104a. In at least one embodiment, wireless electronic device 102 may be configured to search for wireless devices within its proximity and connect to one or more detected wireless devices. In a particular embodiment, wireless electronic device 102 connects to first wireless access point 104a. First wireless access point 104a is configured to provide connectivity to LAN 106a to wireless electronic device 102. Wireless electronic device 102 further receives a first location signal 112a from which wireless electronic device 102 determines its current location. In a particular embodiment, first location signal 112a is a global positioning system (GPS) signal. In another particular embodiment, first location signal 112a is a cellular network based coarse location signal from which wireless electronic device 102 determines its current location. In various embodiments, wireless electronic device 102 stores a first identifier associated with first wireless access point 104a. Wireless electronic device 102 further stores the determined current location of wireless electronic device 102 as first location information in association with wireless access point 104a. In various embodiments, wireless electronic device 102 is configured to store the first identifier and the first location information in a database. In particular embodiments, the database is stored within the wireless electronic device 102. In still other particular embodiments, the database is stored on one or more storage devices associated with a network server.

In a subsequent instance of time, wireless electronic device 102 moves away from the first location (Location #1) and disconnects from the first wireless access point 104a. In one or more embodiments, wireless electronic device 102 may further determine the current location of wireless electronic device 102 at the time of disconnection from first wireless access point 104a and store first disconnection location information representative of the location of wireless electronic device 102 at the time of disconnection from first wireless access point 104a. The second location information may be stored by wireless electronic device 102 in association with the first wireless access point identifier and the first location information.

When wireless electronic device 102 returns to location determined to be within a predetermined proximity to the first location (Location #1), wireless electronic device 102 may be configured to automatically enter an active scanning mode to scan or evaluate for the presence of the identifier associated with first wireless access point 104a and connect to first wireless access point 104a. In some embodiments, wireless electronic device 102 may be configured to disable scanning or alternately, enter an idle scanning mode when wireless electronic device 102 is located beyond the second location information representative of the point of disconnection.

In another subsequent instance of time, wireless electronic device 102 moves to a second location (Location #2) that is proximate to second wireless access point 104b. In at least one embodiment, wireless electronic device 102 may be configured to again search for wireless devices within its proximity and connect to one or more detected wireless devices. In a particular embodiment, wireless electronic device 102 connects to second wireless access point 104a. Second wireless access point 104b is configured to provide connectivity to LAN #2 106n to wireless electronic device 102. Wireless electronic device 102 further receives a second location signal 112b from which wireless electronic device 102 determines its current location. In various embodiments, wireless electronic device 102 stores a second identifier associated with second wireless access point 104b and the determined current location of wireless electronic device 102 as second location information in association with second wireless access point 104b.

Wireless electronic device 102 may be configured to connect to Bluetooth™ wireless device 108, determine its current location and store a third identifier associated with Bluetooth™ wireless device 108 and a third location signal indicative of the current location of wireless electronic device 102 in association with the third identifier. Bluetooth™ wireless device 108 is configured to provide a Bluetooth™ connection to wireless electronic device 102 and may include a headset, speaker, or other Bluetooth™ enabled device.

In still another subsequent instance of time, wireless electronic device 102 may move away from the second location (Location #2) and away from the wireless range of second wireless access point 104b and Bluetooth™ wireless device 108. Upon disconnection from second wireless access point 104b, wireless electronic device 102 may store second disconnection location information in association with the second identifier representative of the current location of wireless electronic device 102 at the time of disconnection. Similarly, wireless electronic device 102 may be configured to store third disconnection location information in association with Bluetooth™ wireless device 108. In various embodiments, when wireless electronic device 102 determines that its current location is beyond the second disconnection location information and/or the third disconnection location information, wireless electronic device 102 may be configured to disable one or more radios such as a Wi-Fi radio and/or a Bluetooth™ radio.

In still another subsequent instance of time, wireless electronic device 102 may move to a location proximate to the first location (Location #1). Upon wireless electronic device 102 determining its current location matches the first location information associated with the first identifier of first wireless access point 104a, wireless electronic device 102 may enter an active scanning mode to actively scan or otherwise evaluate for the presence of first wireless access point 104a. In some embodiments, wireless electronic device 102 may be further configured to automatically connect to first wireless access point 104a upon detecting its presence.

Accordingly, in various embodiments, wireless electronic device 102 may be configured to store location information associated with detected wireless devices within its proximity, and later actively scan or evaluate for the presence of those wireless devices when returning to be initially determine location. In some embodiments, wireless electronic device 102 may remain in an idle scanning mode when it is not near a location matching that of previously scanned and connected to wireless device. Thus, in certain embodiments, power may be conserved by the wireless electronic device 102 when it is not near a location corresponding to locations of previously scanned and connected to wireless devices.

Figure 2:
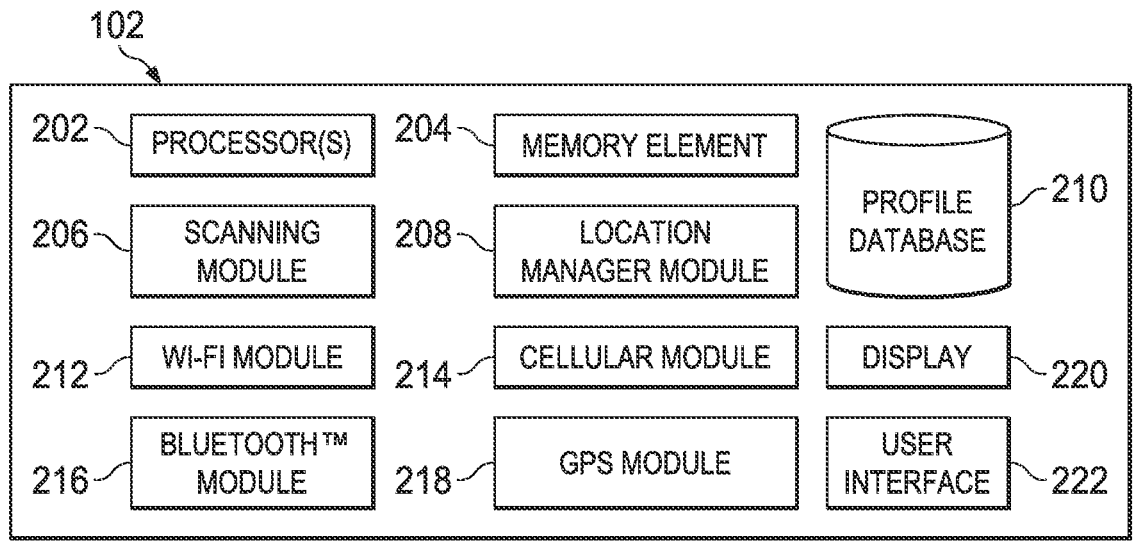
FIG. 2 is a simplified block diagram of a wireless electronic device according to one embodiment.

Referring now to FIG. 2, FIG. 2 is a simplified block diagram of wireless electronic device 102 according to one embodiment. Wireless electronic device 102 includes one or more processor(s) 202, a memory element 204, a scanning module 206, a location manager module 208, a profile database 210, a Wi-Fi module 212, cellular module 214, a Bluetooth™ module 216, and a GPS module 218. Processor(s) 202 is configured to execute various tasks of wireless electronic device 102 as described herein and memory element 204 is configured to store data associated with wireless electronic device 102. Scanning module 206 is configured to implement the various scanning functions of wireless electronic device 102 as further described herein. In at least one embodiment, scanning module 206 periodically scans for wireless devices around its vicinity. Location manager 208 is configured manage location information stored within profile database 210 as will be further described herein. In at least one embodiment, location manager 208 maintains the location information obtained when wireless electronic device 102 connects to a wireless device. In particular embodiments, location manager 208 maintains location information within profile database 210 of the location when wireless electronic device 102 enters into the wireless coverage area of a particular wireless device as well as the location when wireless electronic device 102 moves outside the wireless coverage area of the particular wireless device. In one or more embodiments, scanning module 206 receives a trigger from location manager 208 to initiate scanning and/or evaluating for the presence of a targeted wireless device when wireless electronic device 102 is within a predetermined range of the location associated with the connectivity location information stored within profile database 210 associated with the targeted wireless device.

Wi-Fi module 212, cellular module 214, and Bluetooth™ module 216 are configured to implement Wi-Fi radio communication, cellular radio communication, and Bluetooth™ radio communication, respectively, between wireless electronic device 102 and one or more wireless devices and/or wireless networks. GPS module 218 is configured to receive a GPS signal to aid wireless electronic device 102 in determining its current location as further described herein. Display module 220 is configured to provide visual information to a user of wireless electronic device 102, and user interface module 222 is configured to provide a user interface to allow a user to interact with wireless electronic device 102 as will be further described herein.

In one implementation, wireless electronic device 102 is a wireless device that includes software to achieve (or to foster) the scanning and location managing operations, as outlined herein in this Specification. In other embodiments, certain operations may be executed externally to the wireless electronic device 102, or included in some network element to achieve this intended functionality. Alternatively, wireless electronic device 102 may include software (or reciprocating software) that can coordinate with network elements in order to achieve the operations, as outlined herein. In still other embodiments, one or several devices may include any suitable algorithms, hardware, software, components, modules, interfaces, or objects that facilitate the operations thereof.

Figure 3:
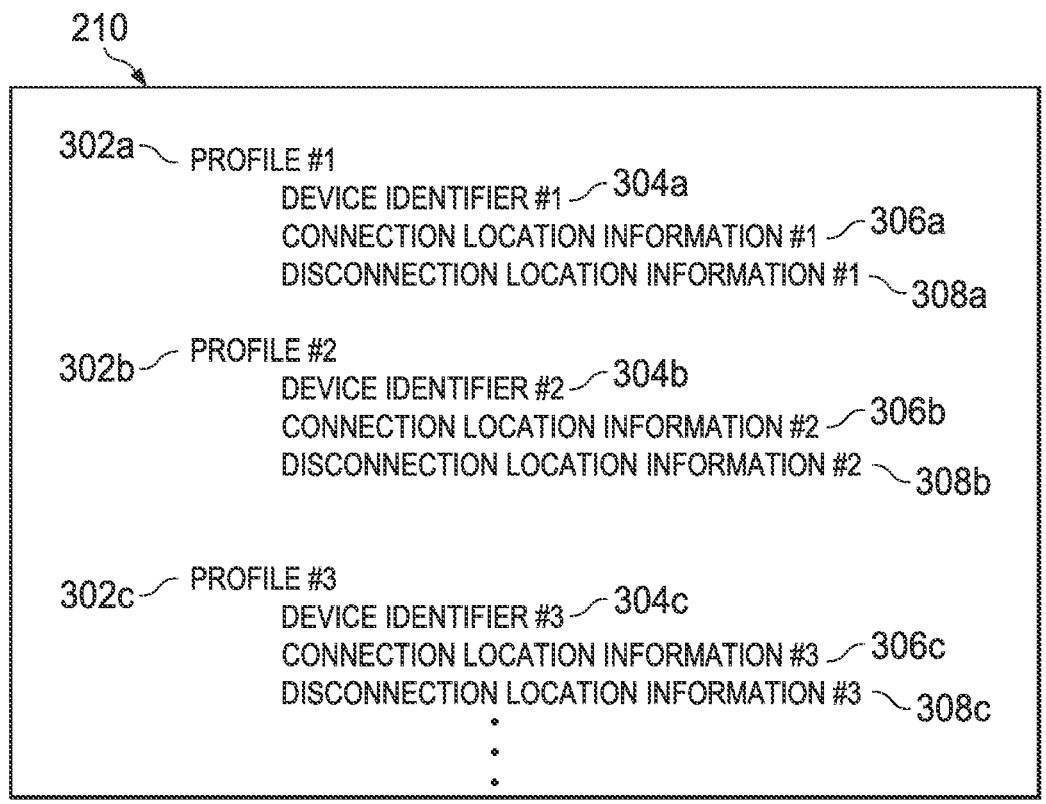
FIG. 3 is a simplified diagram of device profiles maintained within profile database of the wireless electronic device 102 according to one embodiment.

Referring now to FIG. 3, FIG. 3 is a simplified diagram of device profiles maintained within profile database 210 of wireless electronic device 102 according to one embodiment. Profile database 210 includes a first device profile (Profile #1) 302a, a second device profile (Profile #2) 302b, and a third device profile (Profile #3) 302c. First device profile (Profile #1) 302a includes a first device identifier (device identifier #1) which identifies a first wireless device previously scanned and connected with by wireless electronic device 102. In a particular embodiment, the first device identifier 304a is a Media Access Control (MAC) address associated with the scanned wireless device. In still other embodiments, any suitable identifier may be used to identify a particular wireless device. First device profile (Profile #1) 302a further includes first connection location information (connection location information #1) 306a indicative of a current location of wireless electronic device 102 at the time of connection of wireless electronic device 102 with the first wireless device identified by first device identifier (device identifier #1) 304a. In one embodiment, first connection location information 306a is determined from one or more GPS signals received by wireless electronic device 102. In another embodiment, first connection location information 306a is determined from a coarse location signal obtained from a cellular network. In still other embodiments, first connection location information 306a may be obtained via any suitable method for determining a current location of wireless electronic device 102. First device profile 302a further includes first disconnection location information (disconnection location information #1) 308a indicative of a current location of wireless electronic device 102 at a time of disconnection of wireless electronic device 102 with the first wireless device.

Second device profile (Profile #2) 302b of profile database 210 includes a second device identifier (device identifier #2) 304b which identifies a second wireless device previously scanned and connected with by wireless electronic device 102, second connection location information (connection location information #2) 306b indicative of a current location of wireless electronic device 102 at the time of connection of wireless electronic device 102 with the second wireless device identified by second device identifier (device identifier #2) 304b, and second disconnection location information (disconnection location information #2) 308b indicative of a current location of wireless electronic device 102 at a time of disconnection of wireless electronic device 102 with the second wireless device.

Third device profile (Profile #3) 302c of profile database 210 includes a third device identifier (device identifier #3) 304c which identifies a third wireless device previously scanned and connected with by wireless electronic device 102, third connection location information (connection location information #3) 306c indicative of a current location of wireless electronic device 102 at the time of connection of wireless electronic device 102 with the third wireless device identified by third device identifier (device identifier #3) 304c, and third disconnection location information (disconnection location information #3) 308b indicative of a current location of wireless electronic device 102 at a time of disconnection of wireless electronic device 102 with the third wireless device.

Figure 4:
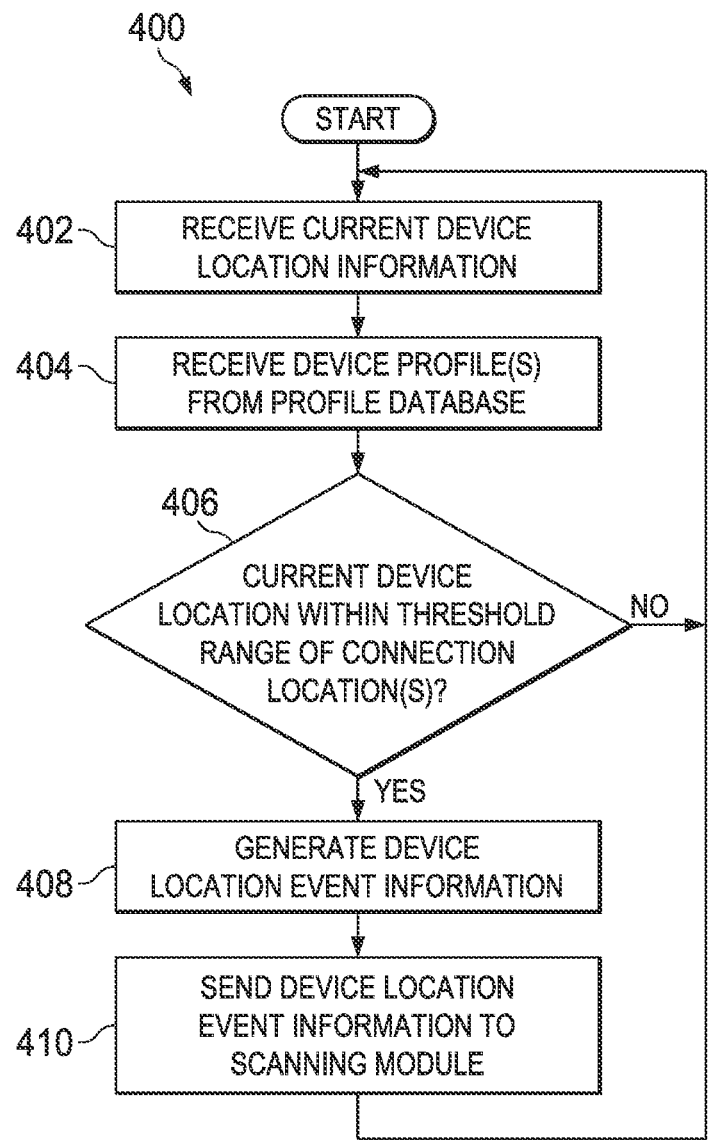
FIG. 4 is a simplified flowchart illustrating potential operations associated with the location manager module of the wireless electronic device according to one embodiment.

Referring now to FIG. 4, FIG. 4 is a simplified flowchart 400 illustrating potential operations associated with the location manager module 208 of wireless electronic device 102 according to one embodiment. In 402, location manager module 208 receives current device location information indicative of a determined current location of wireless electronic device 102. In a particular embodiment, wireless electronic device 102 determines the current device location information using a received location signal such as a GPS signal or coarse location signal obtained from a cellular network. In 404, location manager module 208 receives one or more device profiles from profile database 210. At least one of the profiles may includes a device identifier to identify a wireless device previously scanned by wireless electronic device 102 and connection location information indicating a location of wireless electronic device 102 at a time of connection of wireless electronic device 102 with the wireless device. In some embodiments, a device profile may further include disconnection location information indicating a location of wireless electronic device 102 at a time of disconnection between wireless electronic device 102 and the wireless device.

In 406, location manager module 208 determines whether the current location of wireless electronic device 102 is within a predetermined threshold distance (or range) of a location represented by connection location information contained within one or more device profiles. If the current location of wireless electronic device 102 does not match connection location information found in one or more device profiles within a predetermined threshold, the operations return to 402. If the current location of wireless electronic device 102 does match connection location information found in or more profiles within the predetermined threshold, location manager module 208 generates device location event information in 408. The device location event information includes one or more device identifiers corresponding to the matching connection location information. In 410, the location manager module 208 sends device location event information to scanning module 206. In various embodiments, scanning module 206 uses the device location event information to determine whether wireless electronic device 102 will scan for or evaluate for the presence of nearby devices identified in the device location event information as will be further described herein. In a particular embodiment, wireless electronic device 102 may try to contact, ping, or otherwise reach out to an identified wireless device when it is within the predetermined distance of the location represented by the connection location information associated with the wireless device. In a particular embodiment, wireless electronic device 102 may further wait to receive an acknowledgement from the identified wireless device that is directed to wireless electronic device 102 confirming the presence of the identified wireless device.

Figure 5:
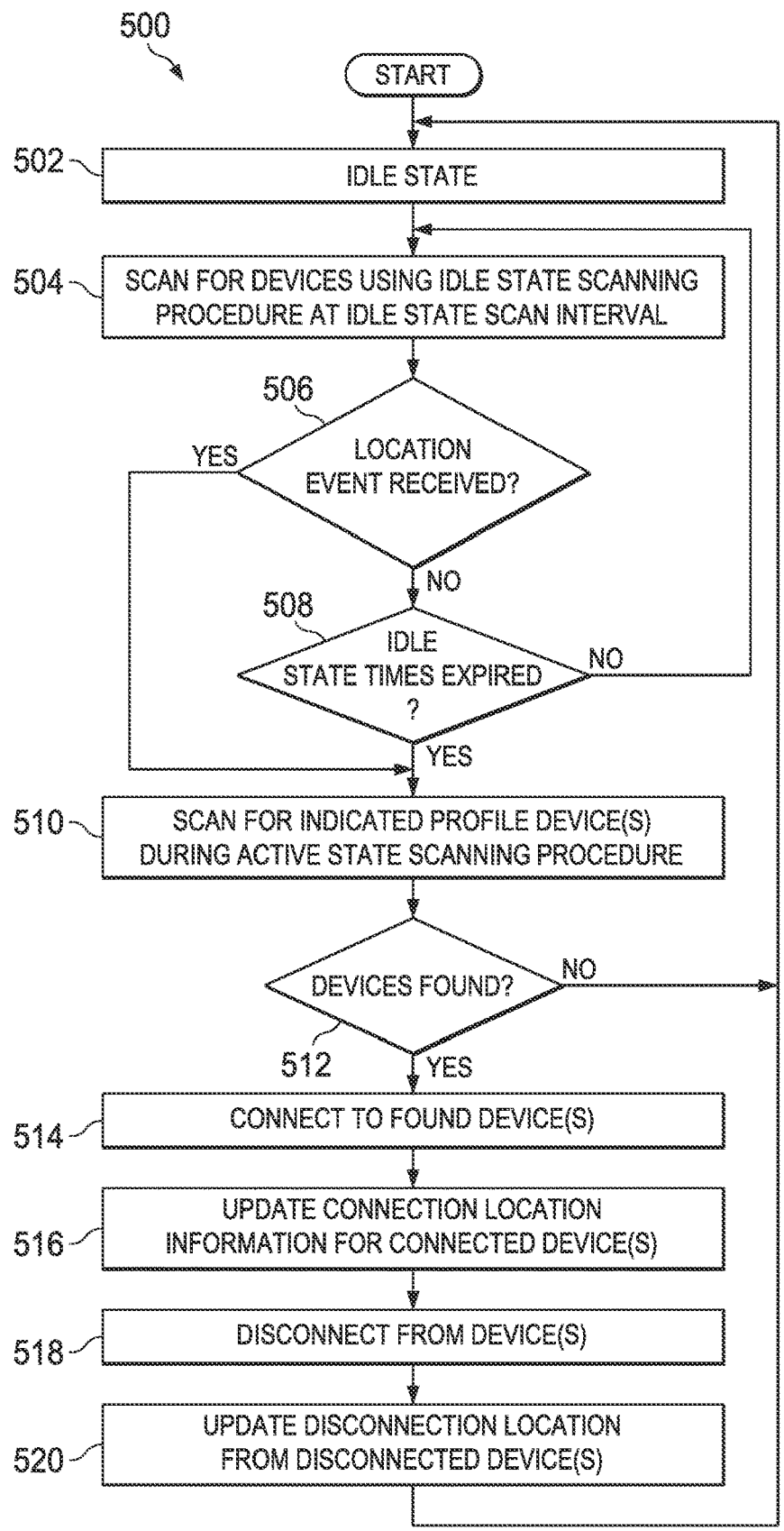
FIG. 5 is a simplified flowchart illustrating potential operations associated with the wireless electronic device according to one embodiment.

Referring now to FIG. 5, FIG. 5 is a simplified flowchart illustrating potential operations associated with wireless electronic device 102 according to one embodiment. In 502, wireless electronic device 102 enters an idle state. In the idle state, scanning module 206 initiates an idle state timer. The idle state timer is a timer that expires after a time equal to a predetermined idle state timer value has elapsed.

In 504, scanning module 206 scans for devices within proximity of wireless electronic device 102 using an idle state scanning procedure at an idle state scan interval. In a particular embodiment, during the idle state scanning module 206 scans for devices during a pseudo-random exponential (2, n) time interval. For example, in a particular embodiment scanning module 206 may scan for devices at an idle state scan interval pseudo-randomly chosen among 2, 4, or 8 second intervals. In still other embodiments, scanning module 206 may disable scanning for devices during the idle state in order to further reduce power consumption of wireless electronic device 102.

In 506, scanning module 206 determines whether device location event information has been received from location manager module 208. If no device location event information has been received by scanning module 206, the operations continue to 508. If device location event information has been received by scanning module 206, the operations continue to 510. In 508, scanning module 206 determines whether the idle state timer has expired. If the idle state timer has not expired, the operations return to 504 in which the idle state scanning procedure continues to be performed.

If device location event information is determined to have been received in 506 or if the idle state timer is determined to have expired in 508, the operations continue to 510. In 510, scanning module 206 scans for or evaluates for the presence of profile devices indicated within the received device location event information during an active state scanning procedure. In some embodiments, scanning module 206 may also scan for other devices within reception range of wireless electronic device 102. In 512, scanning module 206 determines whether a device has been found during the active scanning procedure. If it is determined that no device has found, the operations return to 502 in which the idle state is again initiated. If it is determined in 512 that one or more devices have been found by the active scanning procedure, the operations continue to 514.

In 514, wireless electronic device 102 connects to one or more found devices. In one embodiment, the connection of wireless electronic device 102 to a found device may be performed automatically. In still another embodiment, connection of wireless electronic device 12 is a device may be at the direction of the user using user interface 222. In 516, connection location information for one or more connected devices is updated with the current location of wireless electronic device 102 at the time of its connection with the device within profile database 210. In at least one embodiment, updating the connection location information includes replacing already stored connection location information with the new connection location information. In other embodiments, updating the connection location information includes adding the new connection location information to already stored connection location information. For example, in a particular embodiment multiple instances of connection location information may be stored in a situation in which the same wireless device is encountered in multiple locations. Accordingly, connection location information within a corresponding entry for a particular wireless device within profile database 210 may be updated on each occasion that wireless electronic device 102 connects to the particular wireless device.

In 518, wireless electronic device 102 disconnects from one or more wireless devices. In particular embodiments, wireless electronic device 102 disconnects from a particular wireless device when it moves out of coverage range of wireless signals generated by the particular wireless device. In 520, disconnection location information for one or more disconnected devices is updated with the current location of wireless electronic device 102 at the time of its disconnection with the device within profile database 210.

Various embodiments reduce the need for wireless electronic device 102 to continuously scan for wireless devices in its proximity by using location information events to trigger a scan when the wireless electronic device 102 moves within the vicinity of a location associated with a previously scanned and registered wireless device. In some embodiments, the reduction of the need for continuously scanning for wireless devices may provide for power saving within wireless electronic device 102. In some embodiments, a user may choose to either manually scan for wireless devices or allow automatic triggering of scans based upon location event information.

In some embodiments, wireless electronic device 102 may be configured to enable and disable various wireless radios based upon the connection location information and disconnection location information associated with a particular device. In one embodiment, wireless electronic device 102 may be configured to enable a particular radio module, such as Wi-Fi module 212, cellular module 214, and/or Bluetooth™ module 216, of wireless electronic device 102 when wireless electronic device 102 is within a predetermined distance of a location identified by connection location information associated with a particular wireless device capable of communicating using the radio technology employed by the particular radio module. For example, in a particular embodiment wireless electronic device 102 may be configured to enable Wi-Fi module 212 when wireless electronic device 102 is within range of a connection location associated with first wireless access point 104a. In another embodiment, wireless electronic device 102 may be configured to disable a particular radio module of wireless electronic device 102 when wireless electronic device 102 is within a predetermined range of a location identified by disconnection location information associated with a particular wireless device. For example, in a particular embodiment wireless electronic device 102 may be configured to disable Wi-Fi module 212 when wireless electronic device 102 is within a predetermined distance of a disconnection location associated with first wireless access point 104a.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation may include an apparatus, such as a wireless electronic device, that includes a memory element configured to store electronic code, a processor operable to execute instructions associated with the electronic code, and at least one module. The at least one module is configured to receive first location information identifying a first location associated with an electronic device. The at least one module is further configured to receive first connection location information indicative of a second location of the electronic device at a time of connection with a first wireless device. The at least one module is further configured to scan for the presence of the first wireless device when the first location is within a predetermined distance of the second location.

What is claimed is:

1. A wireless electronic device comprising:
 a display screen to display information;
 a battery;
 memory;
 wireless communication circuitry to provide Bluetooth radio communications and Wi-Fi radio communications, the wireless communication circuitry to:
  identify a first Wi-Fi network within communication range of the wireless electronic device, the first Wi-Fi network associated with a first location;
  establish a connection with the first Wi-Fi network;
  identify a second Wi-Fi network within communication range of the wireless electronic device; and
  establish a connection with the second Wi-Fi network, the second Wi-Fi network associated with a second identifier; and
 at least one processor to execute instructions to:
  cause storage of a first identifier for the first Wi-Fi network;
  disable a Wi-Fi capability; and
  automatically enable the disabled Wi-Fi capability at a particular point in time after disconnection from the first Wi-Fi network.

2. The wireless electronic device of claim 1, wherein the wireless communication circuitry is to establish a connection with a Bluetooth device, and the at least one processor is to:
 disable a Bluetooth capability; and
 automatically enable the Bluetooth capability at a particular point in time after disconnection from the Bluetooth device.

3. The wireless electronic device of claim 1, including circuitry to monitor a location of the wireless electronic device based on at least one of a global positioning system (GPS) signal or a cellular network signal.

4. The wireless electronic device of claim 1, wherein the at least one processor is to disable the Wi-Fi capability based on a user selection.

5. The wireless electronic device of claim 1, wherein the memory is to store the first and second identifiers.

6. The wireless electronic device of claim 1, wherein the at least one processor is to generate and save a first profile for the first Wi-Fi network and a second profile for the second Wi-Fi network, the first profile to include the first identifier and the second profile to include the second identifier.

7. The wireless electronic device of claim 6, wherein the first profile is to include the first location associated with the first Wi-Fi network.

8. The wireless electronic device of claim 1, wherein the wireless electronic device is at least one of a cellular telephone, a smartphone, a notebook computer, a laptop computer, a tablet, or a personal digital assistant (PDA).

9. The wireless electronic device of claim 1, wherein the at least one processor is to automatically enable the disabled Wi-Fi capability in response to a change in a location of the wireless electronic device from the first location to a second location before the particular point in time after the disconnection from the first Wi-Fi network.

10. The wireless electronic device of claim 1, wherein the instructions are stored in the memory.

11. A wireless electronic device comprising:
 means for displaying information;
 a battery;
 memory;
 means for communicating via Wi-Fi, the Wi-Fi communicating means for:
  identifying a first Wi-Fi network within communication range of the wireless electronic device, the first Wi-Fi network associated with a first location and first network information;
  establishing a connection with the first Wi-Fi network;
  identifying a second Wi-Fi network, the second Wi-Fi network associated with second network information; and
  establishing a connection with the second Wi-Fi network; and
 means for processing instructions, the processing means for:
  saving the first network information for the first Wi-Fi network;
  imposing a limitation on a Wi-Fi capability; and
  automatically removing the limitation on the Wi-Fi capability after a time after disconnection from the first Wi-Fi network.

12. The wireless electronic device of claim 11, including means for communicating via Bluetooth, the Bluetooth communicating means for establishing a connection with a Bluetooth device, the processing means for:
 imposing a limitation on a Bluetooth capability; and
 automatically removing the limitation on the Bluetooth capability after a time after disconnection from the Bluetooth device.

13. The wireless electronic device of claim 11, wherein the processing means is for imposing the limitation on the Wi-Fi capability based on a user selection.

14. The wireless electronic device of claim 11, wherein the memory is to store the first and second network information, the first and second network information including respective first and second identifiers.

15. The wireless electronic device of claim 11, wherein the memory is to store a first profile for the first Wi-Fi network and a second profile for the second Wi-Fi network, the first profile to include a first identifier and the second profile to include a second identifier.

16. The wireless electronic device of claim 15, wherein the first profile is to include the first location associated with the first Wi-Fi network.

17. Memory comprising instructions that, when executed, cause an electronic device to at least:
 save a first identifier associated with a first Wi-Fi network;
 impose a limitation on a Wi-Fi capability of the electronic device, the limitation to prevent connection of the electronic device to a second Wi-Fi network; and
 automatically remove the limitation on the Wi-Fi capability of the electronic device to connect with the second Wi-Fi network after an amount of time after disconnection from the first Wi-Fi network.

18. The memory of claim 17, wherein the instructions cause the electronic device to:
 impose a limitation on a Bluetooth capability; and
 automatically remove the limitation on the Bluetooth capability after an amount of time after disconnection from a Bluetooth device.

19. The memory of claim 17, wherein the instructions cause the electronic device to impose the limitation on the Wi-Fi capability based on a user selection.

20. The memory of claim 17, wherein the instructions cause the electronic device to save the first identifier of the first Wi-Fi network and a second identifier of the second Wi-Fi network.

21. The memory of claim 17, wherein the instructions cause the electronic device to generate and save a first profile for the first Wi-Fi network and a second profile for the second Wi-Fi network, the first profile to include the first identifier and the second profile to include a second identifier of the second Wi-Fi network.

22. The memory of claim 21, wherein the first profile is to identify a first geographic location associated with the first Wi-Fi network.

* * * * *